United States Patent
Versteyhe et al.

(10) Patent No.: US 9,371,872 B2
(45) Date of Patent: Jun. 21, 2016

(54) APPARATUS AND METHOD FOR LEARNING FILLING PARAMETERS FOR A CLUTCH

(71) Applicant: Dana Belgium N.V., Bruges (BE)

(72) Inventors: Mark R. J. Versteyhe, Oostkamp (BE); Keivan Shariatmadar, Eeklo (BE)

(73) Assignee: Dana Belgium N.V., Bruges (BE)

( * ) Notice: Subject to any disclaimer, the term of this patent is extended or adjusted under 35 U.S.C. 154(b) by 94 days.

(21) Appl. No.: 14/208,787

(22) Filed: Mar. 13, 2014

(65) Prior Publication Data

US 2014/0277978 A1 Sep. 18, 2014

Related U.S. Application Data

(60) Provisional application No. 61/778,723, filed on Mar. 13, 2013.

(51) Int. Cl.
*F16D 48/06* (2006.01)

(52) U.S. Cl.
CPC .......... *F16D 48/066* (2013.01); *F16D 2300/18* (2013.01); *F16D 2500/1026* (2013.01); *F16D 2500/10412* (2013.01); *F16D 2500/3024* (2013.01); *F16D 2500/30415* (2013.01); *F16D 2500/5014* (2013.01); *F16D 2500/5018* (2013.01); *F16D 2500/50236* (2013.01); *F16D 2500/50245* (2013.01); *F16D 2500/50251* (2013.01); *F16D 2500/5102* (2013.01); *F16D 2500/70217* (2013.01); *F16D 2500/70406* (2013.01)

(58) Field of Classification Search
None
See application file for complete search history.

(56) References Cited

U.S. PATENT DOCUMENTS

| | | | |
|---|---|---|---|
| 4,855,913 A | 8/1989 | Brekkestran et al. | |
| 5,853,076 A | 12/1998 | McKee et al. | |
| 6,341,552 B1* | 1/2002 | Potter | F15B 19/002 91/433 |
| 2004/0122577 A1* | 6/2004 | Ford | F16H 57/04 701/58 |
| 2005/0283297 A1* | 12/2005 | Surianarayanan | F16D 48/066 701/51 |
| 2007/0199794 A1* | 8/2007 | Miyazaki | F16D 13/648 192/113.36 |
| 2009/0299583 A1* | 12/2009 | Dell' Eva | F16H 59/68 701/51 |
| 2011/0112737 A1 | 5/2011 | Neelakantan et al. | |

FOREIGN PATENT DOCUMENTS

WO WO2013029058 A1 2/2013

* cited by examiner

*Primary Examiner* — Justin Holmes
(74) *Attorney, Agent, or Firm* — Marshall & Melhorn, LLC (57) ABSTRACT

A method and a device for calibrating a wet clutch is provided. The clutch comprises a pump, a piston, a proportional valve, a controller, and a pressure sensor. The method comprises the steps of closing the clutch by sending a pressure profile with fill parameters from the controller to the proportional valve, recording a pressure signal of the hydraulic fluid, comparing the pressure profile with the pressure signal, determining whether at least one defined feature is in the pressure signal that is indicative of errors in the fill parameters, and if said feature is determined in the pressure signal, modification of the pressure profile by changing at least one of the fill parameters.

20 Claims, 9 Drawing Sheets

APPARATUS AND METHOD FOR LEARNING FILLING PARAMETERS FOR A CLUTCH

RELATED APPLICATIONS

The present application claims the benefit to U.S. Provisional Application No. 61/778,723 filed on Mar. 13, 2013, which is incorporated herein in its entirety by reference.

FIELD OF THE INVENTION

The present invention relates to the operation of hydraulic clutches and more specifically to an apparatus and method of learning filling parameters for wet plate clutches.

BACKGROUND OF THE INVENTION

In the shifting of a stepped ratio transmission, clutches are engaged and disengaged to allow for power transfer through a plurality of different power paths. Typically, when a shift is performed, one clutch is disengaged (also known as an off-going clutch) by decreasing an oil pressure on a piston of the clutch and another clutch is engaged (also known as an oncoming clutch) by increasing a pressure on a piston of the clutch. During an overlap shift, this process happens simultaneously in a coordinated manner. In a filling phase of a shift, the piston of the ongoing clutch is positioned adjacent a plurality of friction plates by regulating a pressure of the transmission fluid.

A positioning of the piston is performed by sending out a pulse width modulated (also known as PWM) signal from a controller to an electroproportional valve. In response to the signal, the electroproportional valve applies a pressure to a piston chamber of the clutch. Depending on a force created by this pressure, a position of the piston can be controlled. Typically, it is desired to position the piston adjacent a set of friction plates as fast as possible while making sure an engagement of the friction plates occurs in a smooth manner.

A pressure profile employed by the controller may be dependent on many variables, such as, but not limited to a plurality of mechanical characteristics of the clutch, a temperature of an automatic transmission fluid, a pressure within a fluid conduit, and an amount of air within the fluid conduit. Generally, these variables can be taken into account by scheduling the two parameters with which the pressure profile is parameterized.

A problem that remains however, is how to obtain a correct value for each of these parameters. The value should be specific for a transmission and even for an individual clutch. Currently, it is common practice for the filling parameters to be determined through a calibration process. The calibration process is performed following vehicle production and then the calibration process is repeated at fixed intervals based on a number of operating hours of the vehicle. Typically, the process takes place through the following steps. After a predetermined number of operating hours, the controller of the transmission indicates that a recalibration is advised. When the calibration process is started, the controller sends out a number of filling profiles with changing fill parameters to a valve of the transmission. This process is continued until adequate filling is achieved for the corresponding clutch. The timing of a drop in torque converter speed ratio is used as an indicator for a quality of the filling of the clutch. The drop is indicative of torque transfer through the clutch, which is a sign of the piston contacting the set of friction plates. The calibration process is then repeated for each of the remaining clutches.

While the calibration process described above is capable of determining the correct filling parameters, it does so only for fixed conditions. The calibration process is performed with a transmission that has been warmed up and a time between fillings is very short in duration. As a result, the parameters that are obtained are in fact only valid in conditions similar to those that were present during the calibration. During actual use of the transmission, artificial and approximate correction factors need to be applied to compensate for such a calibration. The correction factors are not in all cases a good representation of the characteristics of the actual system, which can lead to errors in the filling and consequently, poor shift quality.

Further, tolerances on the production process of the components of the transmission are partially responsible for the variability during the filling process. While generally accurate parameters can be obtained by performing a calibration following production, the system also changes as the friction plates wear, an automatic transmission fluid wears out, and a stiffness of a clutch spring deteriorates. The optimal values of these parameters change over time. The current typical calibration process which is used to solve these problems takes a considerable amount of time, and during the calibration process the vehicle cannot be used. As an amount of the time between recalibrations is not based on the actual condition of the transmission, but rather as a fixed number of operating hours, reducing a number of recalibrations is achieved by imposing limitations on the mechanical system. During production, tight tolerances are imposed on both components and assembly of the system. These tolerances, which increase a cost of the system, could be relaxed if a method were available to determine the correct parameters for the filling of a specific clutch and to keep them within acceptable bounds over a lifetime of the clutch.

Furthermore, only the usage of a single type of transmission fluid is recommended by the manufacturer, as the temperature or viscosity compensation factors are only valid for the recommended type of transmission fluid. Lack of versatility in this respect can increase ownership and maintenance costs of the vehicle.

Another problem with the current typical calibration process is that the transmission controller is not aware when a bad shift is performed as a result of unsuitable fill parameters. Even though the mechanical system might have changed considerably, the controller maintains use of the same parameters until the calibration process is initiated manually or the recommended number of operating hours between calibrations is reached.

It would be advantageous to develop a device and method for learning filling parameters for a clutch that eliminates a need for transmission calibrations, allows components having greater production tolerances to be used in the clutch, and allows a variety of transmission fluids to be used with the clutch.

SUMMARY OF THE INVENTION

Presently provided by the invention, a device and method for learning filling parameters for a clutch that eliminates a need for transmission calibrations, allows components having greater production tolerances to be used in the clutch, and allows a variety of transmission fluids to be used with the clutch, has surprisingly been discovered.

In one embodiment, the present invention is directed to a method for calibrating a wet clutch. The clutch comprises a pump, a piston, a proportional valve, a controller, and a pressure sensor. The pump provides a housing with a hydraulic fluid. The piston is movably disposed in the housing. The piston is movable between an extended position by a preloaded spring and into a retracted position by applying an engagement pressure on the piston by the hydraulic fluid. In the retracted position, torque is transmittable through the clutch. The proportional valve is disposed between the pump and the housing for regulating a pressure of the hydraulic fluid in the housing. The controller controls the proportional valve. The pressure sensor measures a pressure of the hydraulic fluid in the housing. The method comprises the steps of closing the clutch by sending a pressure profile with fill parameters from the controller to the proportional valve, recording a pressure signal of the hydraulic fluid, comparing the pressure profile with the pressure signal, determining whether at least one defined feature is in the pressure signal that is indicative of errors in the fill parameters, and if said feature is determined in the pressure signal, and modification of the pressure profile by changing at least one of the fill parameters.

In another embodiment, the present invention is directed to an apparatus for calibrating a wet clutch. The clutch comprises a pump, a piston, a proportional valve, a controller, a pressure sensor, a recording device, a comparing device, and a determining device. The pump provides a housing with a hydraulic fluid. The piston is movably disposed in the housing. The piston is movable between an extended position by a preloaded spring and into a retracted position by applying an engagement pressure on the piston by the hydraulic fluid. In the retracted position torque is transmittable through the clutch. The proportional valve is disposed between the pump and the housing for regulating a pressure of the hydraulic fluid in the housing. The controller is configured for controlling the proportional valve by sending a pressure profile with fill parameters to the proportional valve. The pressure sensor measures a pressure of the hydraulic fluid in the housing. The recording device records a pressure signal of the hydraulic fluid. The comparing device compares pressure signals. The determining device determines at least one defined feature in a pressure signal that is indicative of errors in the fill parameters.

Various aspects of this invention will become apparent to those skilled in the art from the following detailed description of the preferred embodiment, when read in light of the accompanying drawings.

BRIEF DESCRIPTION OF THE FIGURES

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
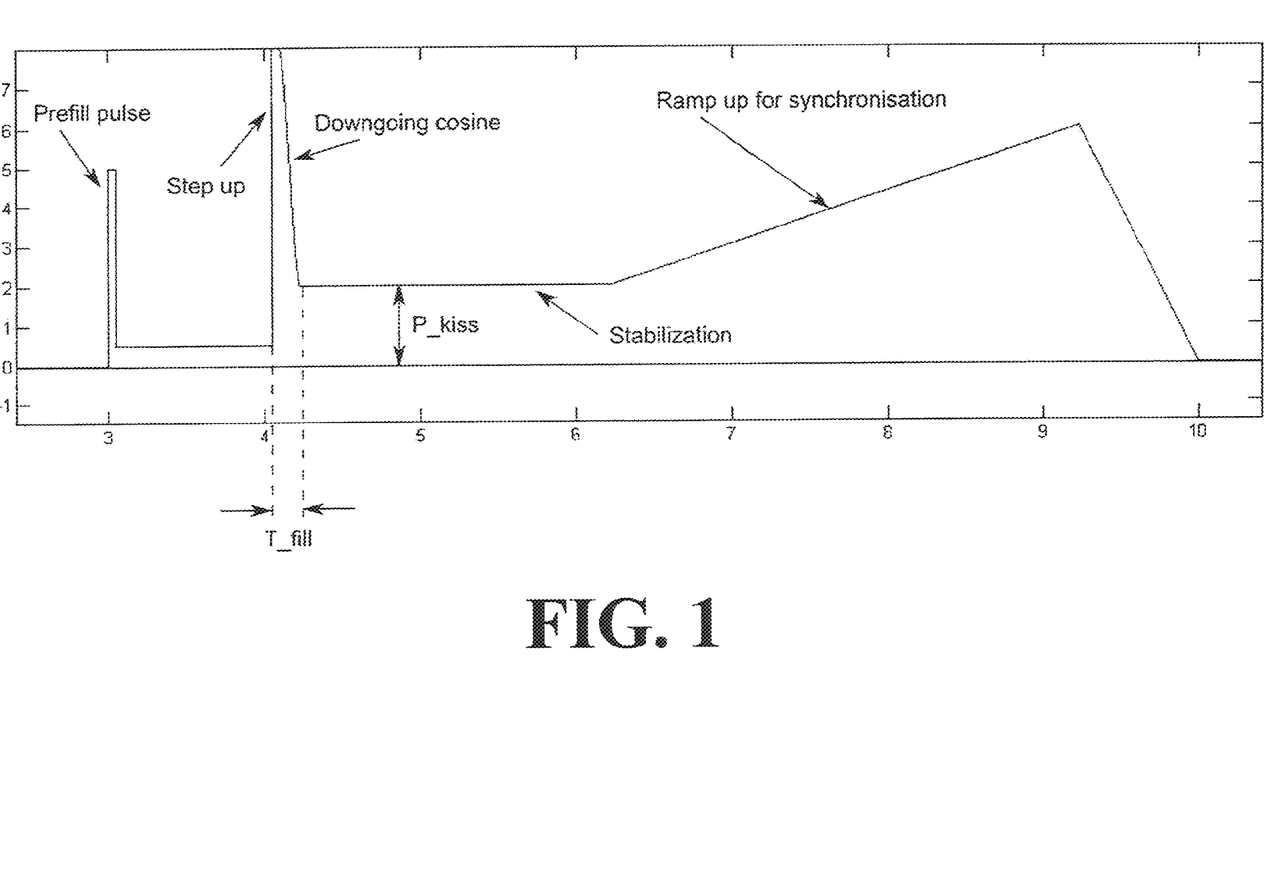
FIG. 1 is a graph which illustrates a pressure profile of an engaging hydraulic piston associated with a clutch system.

A process of filling of a clutch is commonly characterized by two main parameters, a fill time and a kiss pressure. These parameters are shown on an exemplary pressure profile, which is illustrated in FIG. 1. A reference of "T_fill" in FIG. 1 indicates the fill time of the exemplary pressure profile, and a reference of "P_kiss" indicates the kiss pressure of the exemplary pressure profile. It should be noted that an apparatus and a method described herein is also applicable when more parameters than a fill time and a kiss pressure are analyzed.

The fill time indicates a length in time of a pressure profile required to fill a piston chamber with hydraulic oil and to position a piston against a set of friction plates of the clutch. The kiss pressure is a pressure following the fill time for a pressure profile. The kiss pressure indicates a hydraulic force necessary to counteract a spring force once the piston is placed against the set of friction plates. While the kiss pressure changes slowly over time as a plurality of mechanical characteristics of a clutch system including the clutch change, the fill time is dependent on other factors. Primarily, the fill time is function of a temperature of a transmission oil used with the clutch, a pressure signal used with the clutch system, and an amount of time between shifts.

The present invention provides a learning algorithm which may be used to determine the fill parameters of fill time and kiss pressure. The learning algorithm determines the fill time and the kiss pressure by evaluating a previous filling process for the clutch and adapting the fill time and the kiss pressure for the next filling process. The learning algorithm may be used during normal operation of a vehicle including the clutch. As a result, a basic implementation of the learning algorithm requires no specialized shifting processes or adaptation of a pressure profile using a controller. By evaluating a previous filling process for the clutch and adapting the fill time and the kiss pressure for the next filling process, the learning algorithm makes use of a last best estimate of the fill parameters.

The learning algorithm determines the fill time and the kiss pressure by evaluating the previous filling process, through information collected using at least one sensor. However, a number of sensors available to provide information to the learning algorithm in a transmission including the clutch system is typically limited. Typically, in a production transmission, the controller is able to be provided with information such as a speed signal and the pressure signal, which can be indicative of a quality of the filling process. However, in certain instances, such as during an overlap shift, the speed signal during the filling process is determined by an offgoing clutch. As a result, during the overlap shift, the speed signal provides little information about the filling process. The pressure signal, however, can provide information about the filling process during the overlap shift, for example.

Figure 2:
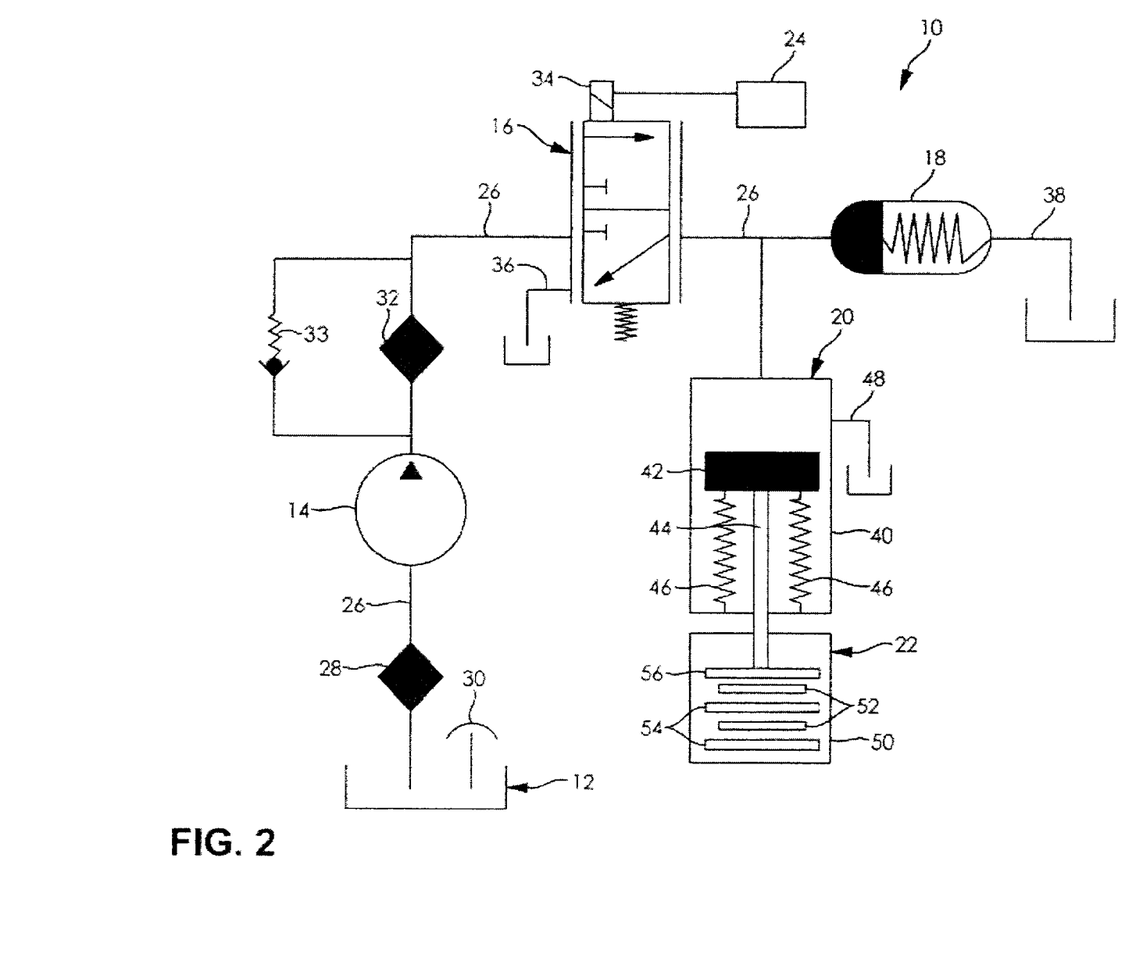
FIG. 2 is a schematic illustration of a clutch system according to the present invention.

FIG. 2 illustrates a clutch system 10 that may be used with the transmission. The clutch system 10 is an electrohydraulically actuated wet multi-plate clutch system. The clutch system 10 is an electrohydraulically actuated wet plate clutch system. The clutch system 10 comprises a sump 12, a high pressure pump 14, an electroproportional valve 16, an accumulator 18, a piston assembly 20, a clutch assembly 22, a controller 24, and a plurality of fluid conduits 26. The high pressure pump 14 is in fluid communication with the sump 12 and the electroproportional valve 16. The piston assembly 20 is in fluid communication with the electroproportional valve 16 and the accumulator 18. The clutch assembly 22 is disposed adjacent to and may be placed in contact with a portion of the piston assembly 20. The controller 24 is in communication with the electroproportional valve 16.

The sump 12 is a container in which a hydraulic fluid is stored. The sump 12 is in fluid communication with the high pressure pump 14. One of the fluid conduits 26 affords fluid communication between the sump 12 and the high pressure pump 14. A filter 28 forms a portion of the fluid conduit 26 between the sump 12 and the high pressure pump 14. The sump 12 includes a breather 30, to facilitate fluid communication between an ambient environment of the clutch system 10 and an interior of the sump 12.

The high pressure pump 14 is a fixed displacement hydraulic pump. The high pressure pump 14 is in fluid communication with the sump 12 and the electroproportional valve 16. As a non-limiting example, the high pressure pump 14 may generate a pressure of about 20 bar. One of the fluid conduits 26 affords fluid communication between the high pressure pump 14 and the electroproportional valve 16. A filter 32 forms a portion of the fluid conduit 26 between the high pressure pump 14 and the electroproportional valve 16. A pressure relief valve 33 is present to limit a pressure difference across the filter 32 created by the high pressure pump 14, such as if the filter 32 becomes obstructed. Further, it is understood that the high pressure pump 14 may also be in fluid communication with a pressure limiting valve (not shown). The pressure limiting valve limits a pressure within the fluid conduit 26 between the high pressure pump 14 and the electroproportional valve 16.

The electroproportional valve 16 is a hydraulic valve in fluid communication with the high pressure pump 14, the piston assembly 20, and the accumulator 18. The electroproportional valve 16 is in electrical communication with the controller 24. The electroproportional valve 16 is supplied with a pulse width modulated signal to apply a current to a solenoid 34 forming a portion of the electroproportional valve 16. Upon receipt of the pulse width modulated signal, the electroproportional valve 16 may be placed in at least a partially open position. In the open position, the electroproportional valve 16 afford fluid communication between the fluid conduit 26 between the high pressure pump 14 and the electroproportional valve 16 and a fluid conduit 26 between the electroproportional valve 16, the piston assembly 20, and the accumulator 18. It is understood that the controller 24 may adjust the pulse width modulated signal to adjust a pressure within the fluid conduit 26 between the electroproportional valve 16, the piston assembly 20, and the accumulator 18 by placing the electroproportional valve 16 in at least the partially open position. As shown in FIG. 2, the electroproportional valve 16 includes a draining orifice 36. A flow of hydraulic fluid through the draining orifice 36 is dependent on a pressure within the electroproportional valve 16, but also a viscosity of the hydraulic fluid and a temperature of the hydraulic fluid.

The accumulator 18 is a hydraulic device that dampens rapid changes in pressure (such as pressure drops or pressure peaks) within the fluid conduit 26 between the electroproportional valve 16 and the piston assembly 20. The accumulator 18 facilitates smooth operation of the clutch assembly 22. The accumulator 18 is in fluid communication with the piston assembly 20 and the electroproportional valve 16. As shown in FIG. 2, the accumulator 18 includes a draining orifice 38. A flow of hydraulic fluid through the draining orifice 38 is dependent on a pressure within the fluid conduit 26 between the electroproportional valve 16 and the piston assembly 20, but also a viscosity of the hydraulic fluid and a temperature of the hydraulic fluid.

The piston assembly 20 comprises a housing 40, a piston 42, a piston rod 44, and at least one return spring 46. The housing 40 is a hollow, cylindrical member in fluid communication with the electroproportional valve 16 through the fluid conduit 26 between the electroproportional valve 16, the piston assembly 20, and the accumulator 18. The piston 42 is a cylindrical member sealingly and slidingly disposed within the housing 40. The piston rod 44 is an elongate member in driving engagement with the piston 42. The piston rod 44 is sealingly and slidingly disposed through the housing 40. The at least one return spring 46 is a biasing member disposed between the piston 42 and the housing 40. When pressure at or above an engagement threshold is applied to the housing 40 by the electroproportional valve 16, the pressure within the housing 40 urges the piston 42 and the piston rod 44 towards the clutch assembly 22, while also compressing the at least one return spring 46. When pressure at or below a disengagement threshold is present within the housing 40, the at least one return spring 46 urges the piston 42 and the piston rod 44 into a starting position. As shown in FIG. 2, the housing 40 includes a draining orifice 48. A flow of hydraulic fluid through the draining orifice 48 is dependent on a pressure within the housing 40, a portion of which may be generated by centripetal forces, but also a viscosity of the hydraulic fluid and a temperature of the hydraulic fluid.

The clutch assembly 22 comprises a housing 50, a first plurality of plates 52, a second plurality of plates 54, and a pressure plate 56. The housing 50 is a hollow member into which a transmission fluid is disposed. The first plurality of plates 52 and the second plurality of plates 54 are rotatingly disposed within the housing 50. The pressure plate 56 is disposed adjacent the first plurality of plates 52 and the second plurality of plates 54 and may be urged towards the first plurality of plates 52 and the second plurality of plates 54 by the piston rod 44. The first plurality of plates 52 is interleaved with the second plurality of plates 54. Within the clutch assembly 22, an input member (not shown) is drivingly engaged with one of the first plurality of plates 52 and the second plurality of plates 54 and an output member (not shown) is drivingly engaged with a remaining one of the first plurality of plates 52 and the second plurality of plates 54. A pressure in which the piston rod 44 contacts the pressure plate 56 and where additional pressure would result in at least variable driving engagement between the first plurality of plates 52 and the second plurality of plates 54 is known as a kiss pressure. At pressures greater than the kiss pressure, torque is able to be transferred from the first plurality of plates 52 to the second plurality of plates 54 or from the second plurality of plates 54 to the first plurality of plates, depending on a configuration of the clutch assembly 22. When pressure at or above the engagement threshold is applied to the housing 40 by the electroproportional valve 16, the pressure within the housing 40 urges the piston 42 and the piston rod 44 towards the clutch assembly 22, applying a pressure to the first plurality of plates 52 and the second plurality of plates 54 through the pressure plate 56. In response to the pressure, the first plurality of plates 52 becomes at least variably drivingly engaged with the second plurality of plates 54, causing the input member to be at least variably drivingly engaged with the output member.

It is understood that the schematic illustration shown in FIG. 2 is merely exemplary in nature, and that the invention may be adapted for use with any wet plate clutch system.

The learning algorithm used with the clutch system 10 performs three steps to revise the fill parameters, fill time and kiss pressure. The three steps are measurement evaluation, feature detection, and implement a corrective action.

First, the measurement of the pressure signal from the filling process is evaluated. A goal of the evaluation is to detect a plurality of features that are indicative of errors in the fill parameters used in the previous filling process. The parameters of fill time and kiss pressure can each be either too low or too high. If the fill time is too high, a resulting effect is referred to as overfill. If the fill time is too low, a resulting effect is referred to as underfill. If the kiss pressure at the end of the pressure profile is too low, a resulting effect is referred to as underkiss. If the kiss pressure at the end of the pressure profile is too high, a resulting effect is referred to as overkiss. Because of these effects, four possibilities exist when evaluating the pressure signal.

By observing the pressure signal of the filling process with varying fill parameters, deviations in the pressure signal (which may be described as bumps in the signal) can be observed. The deviations in the pressure signal vary in both size and position in the pressure signal. The deviations in the pressure signal may be recognized as a feature of the control signal, which are representative of an error in at least one of the filling parameters. Accordingly, through recognition of features of the pressure signal, information on the error in at least one of the filling parameters can be obtained, and the learning algorithm can implement a corrective action to the control signal.

The features of the pressure signal may be categorized. It should be mentioned that different systems will allow for the detection of varying features, and that the examples described below are merely exemplary. The method described however, is generally applicable. FIGS. 3-6 illustrate experimental data collected that show the features of the pressure signal that may be detected. With regards to detection and quantification of the features shown in FIGS. 3-6, the pressure signal is shown in relative time. Relative time is scaled with respect to the fill time. An origin of the horizontal axis shown in FIGS. 3-6 is located at a beginning of the fill time.

Figure 3:
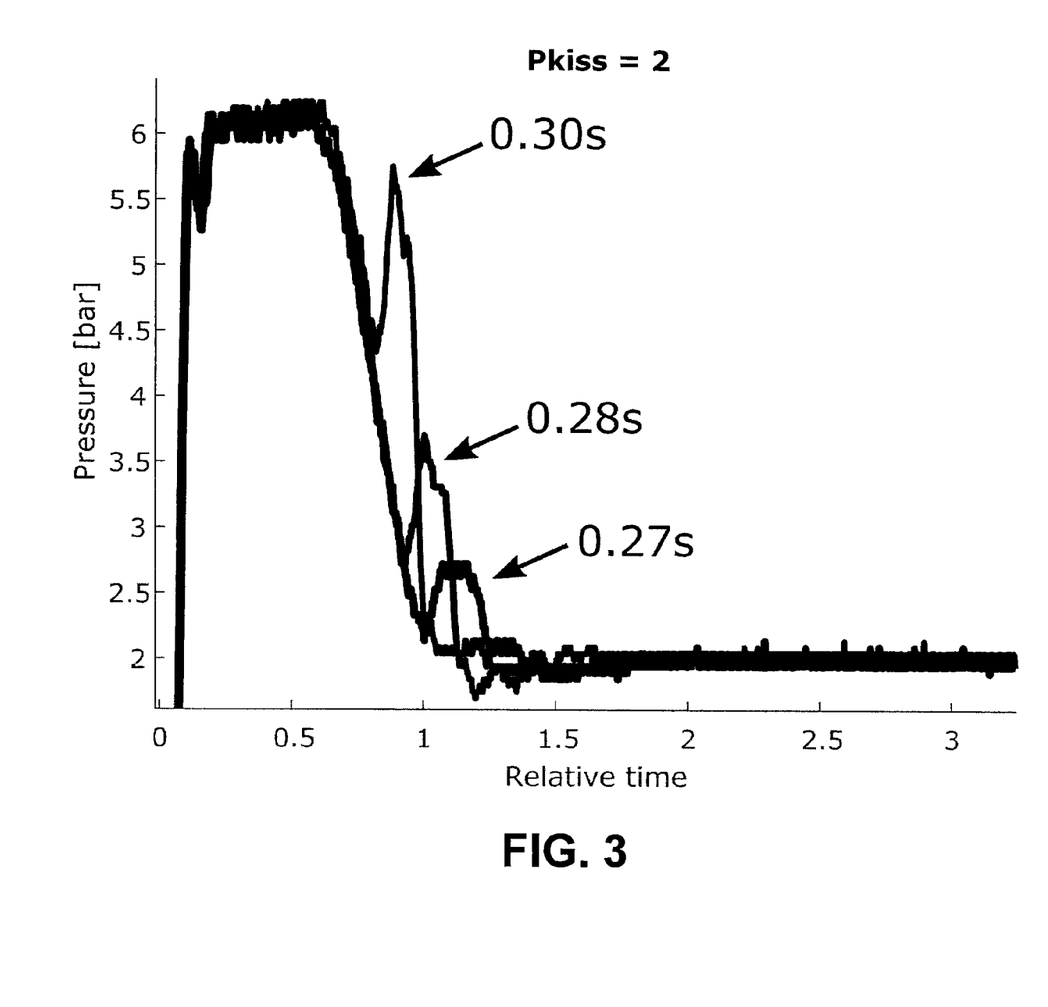
FIG. 3 is a graph which illustrates a portion of several pressure profiles of an engaging hydraulic piston associated with the clutch system illustrated in FIG. 2, the pressure profiles illustrating a feature during a fill time of the clutch system.
Figure 7:
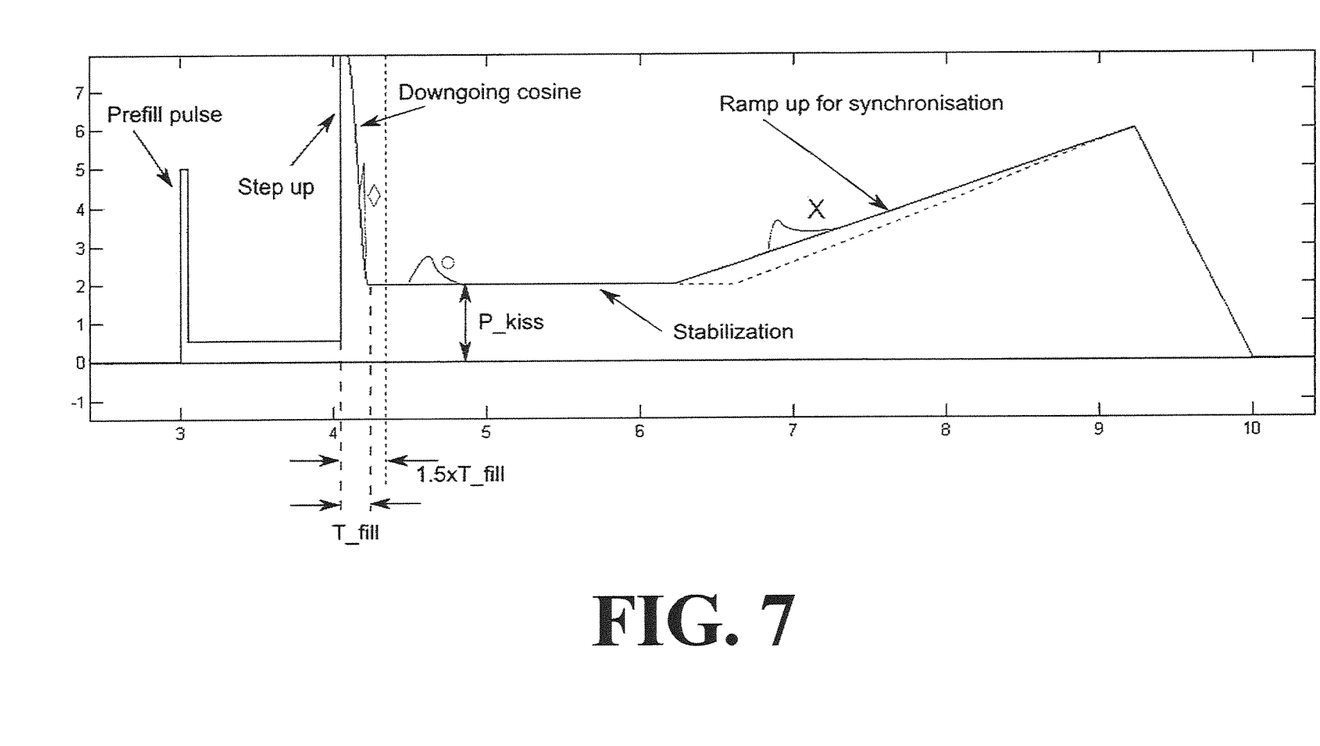
FIG. 7 is a graph which illustrates a pressure profiles and a plurality of features of the pressure profile of an engaging hydraulic piston associated with the clutch system illustrated in FIG. 2.
Figure 8:
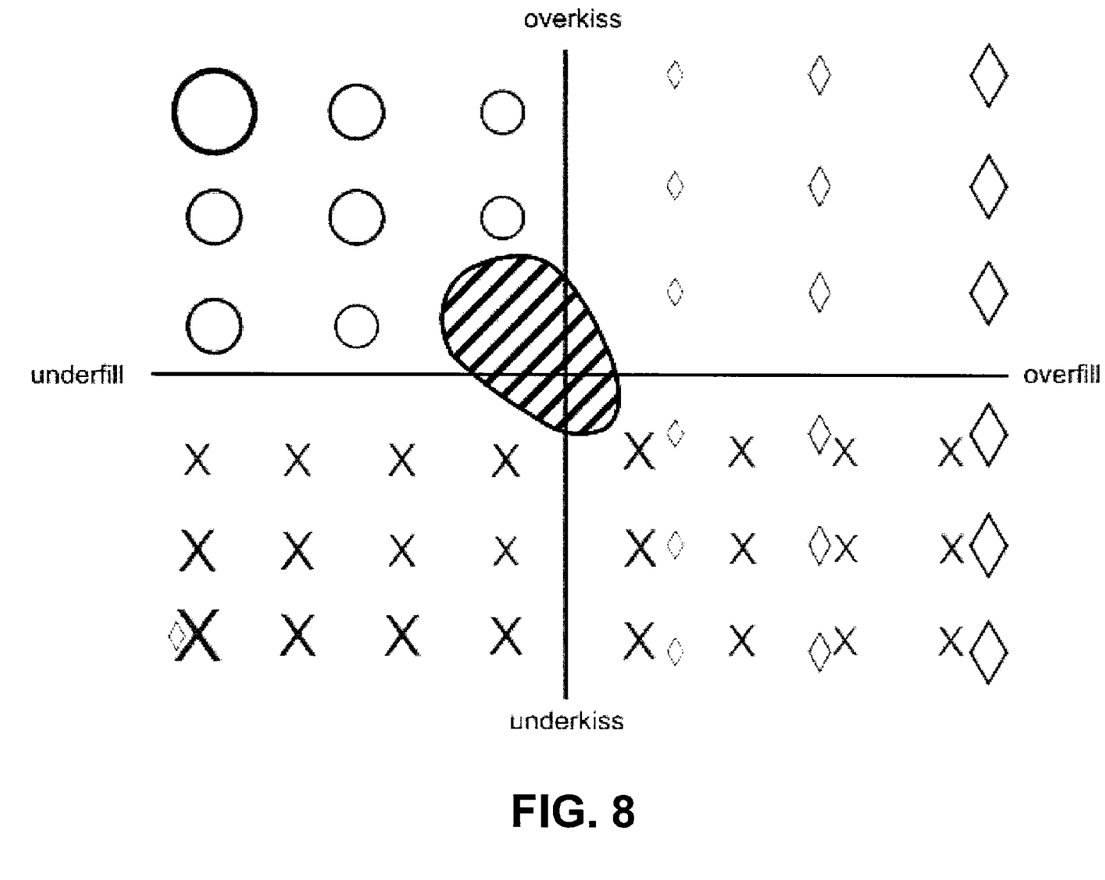
FIG. 8 is a fill plane which indicates a location of the types of features with respect to the effects of underfill, overfill, overkiss, and underkiss of an engaging hydraulic piston associated with the clutch system illustrated in FIG. 2.
Figure 9:
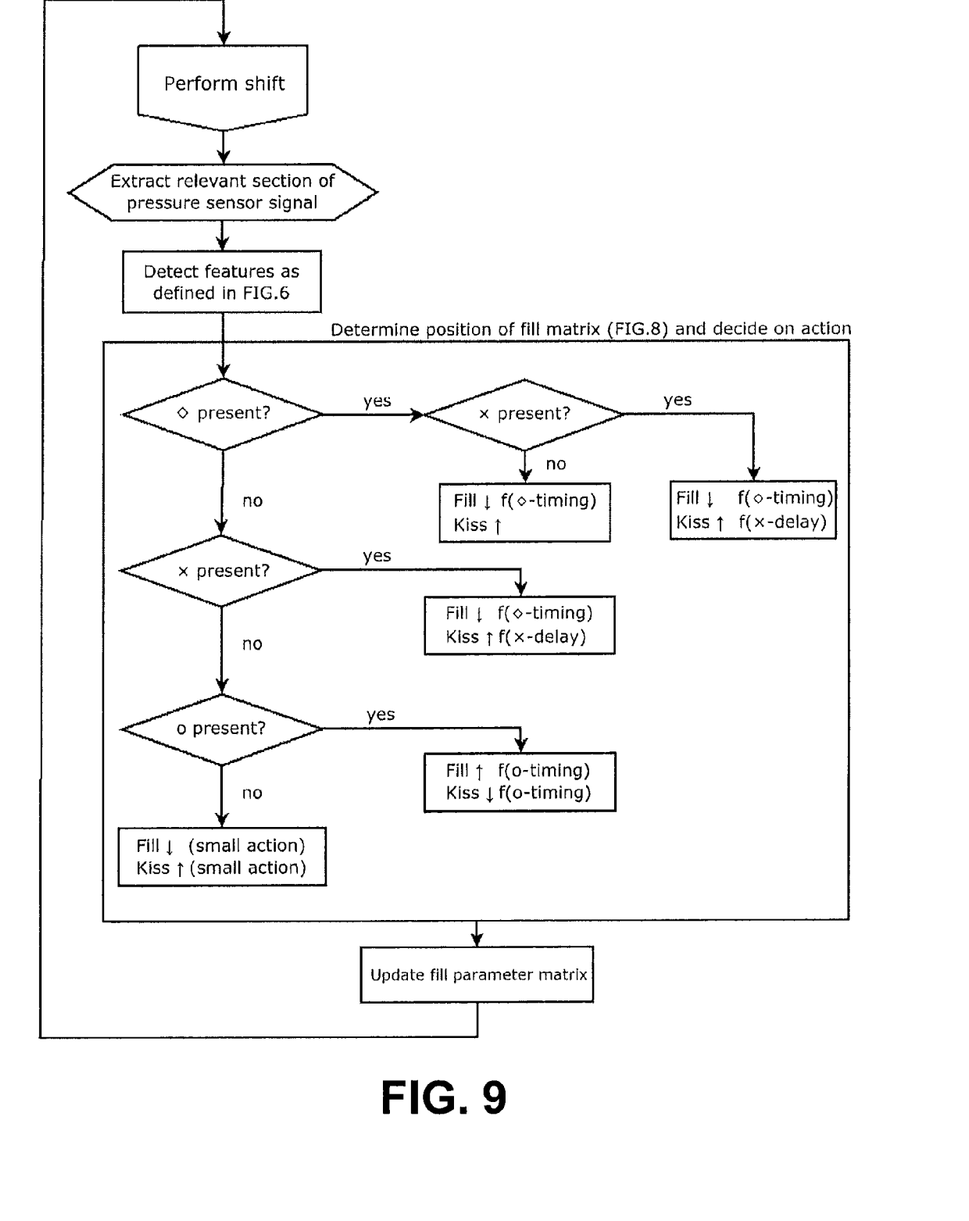
FIG. 9 is a flow chart illustrating a learning algorithm of the clutch system illustrated in FIG. 2.

FIG. 3 illustrates a feature that occurs near an end of the fill time. The feature can be described as a positive deviation in the pressure signal, and will be referred to as a first feature, and is represented in FIG. 7-9 as a diamond shape. The first feature primarily occurs in the pressure signal where overfill is present, regardless of whether underkiss, overkiss or a nominal kiss pressure is also present, as shown in FIG. 8. Additionally, it has been observed and is shown in the data of FIG. 3, that the first feature occurs earlier in time as a severity of overfill is increased, represented by a thickness of a line representing each data set. With regards to the clutch system 10, this occurs when the piston 42 applies a force to the plates 52, 54 through the piston rod 44 and the pressure plate 56 during a fill phase of the housing 40. If the piston 42 applies a force to the plates 52, 54 earlier in the fill phase, and thus at a higher pressure, the first feature is of greater severity. It should be noted however, that the first feature is not only observed where overfill is present. In the pressure signal where severe underfill and underkiss is present, the first feature is also present, as shown in FIG. 8. In that case, the learning algorithm is capable of recognizing and disregarding such a condition. Information on a severity of the first feature can also be used to determine the type of filling error.

Figure 4:
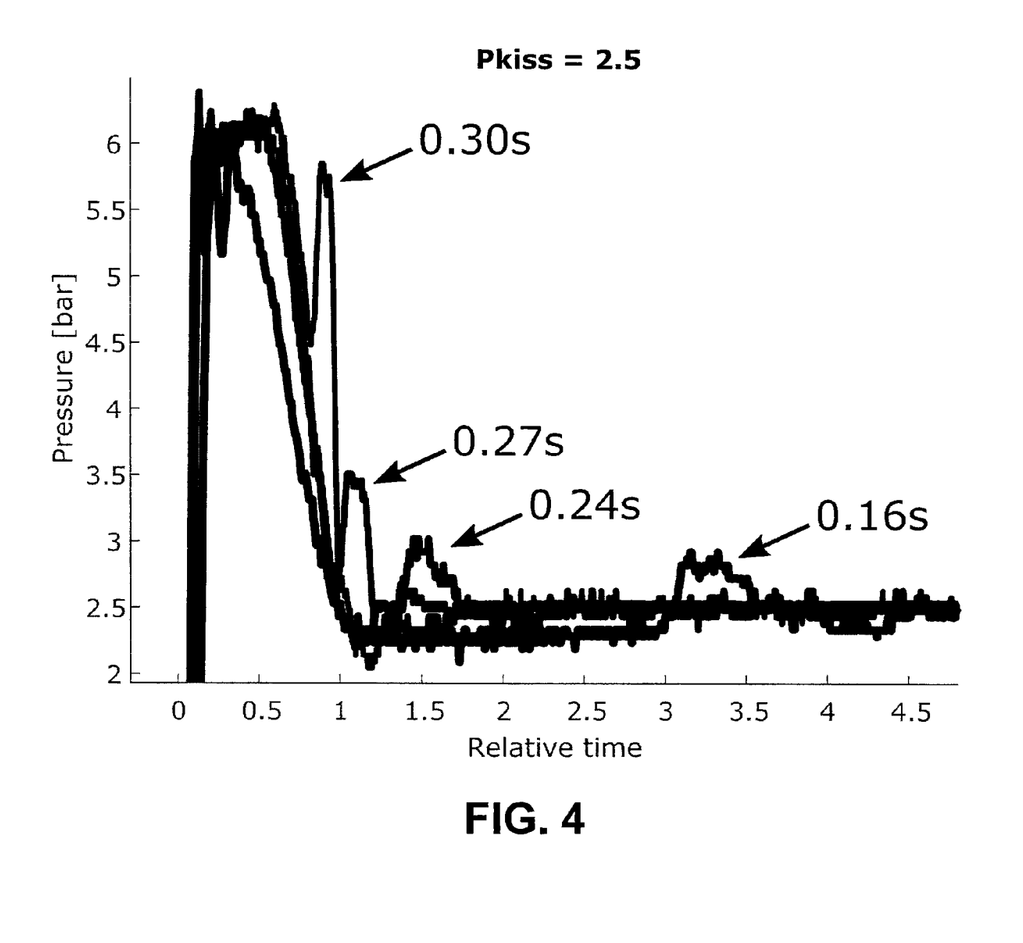
FIG. 4 is a graph which illustrates a portion of several pressure profiles of an engaging hydraulic piston associated with the clutch system illustrated in FIG. 2, the pressure profiles illustrating a feature during a stabilization phase of the clutch system.
Figure 5:
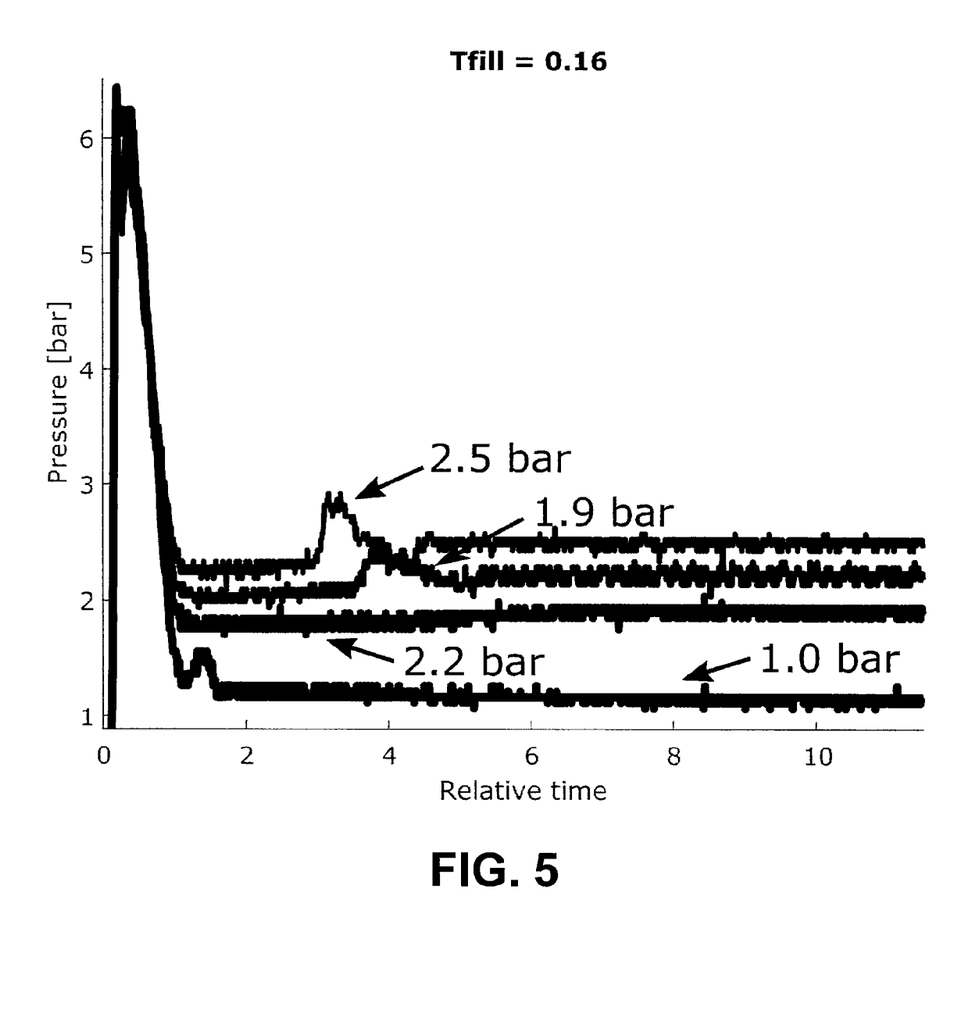
FIG. 5 is a graph which illustrates a portion of several pressure profiles of an engaging hydraulic piston associated with the clutch system illustrated in FIG. 2, the pressure profiles illustrating a feature during a stabilization phase of the clutch system.

FIG. 4 illustrates a feature that occurs between an end of the fill time and a beginning of a synchronization ramp (shown in FIG. 1), such as during a stabilization phase (also shown in FIG. 1). The feature can be described as a positive deviation in the pressure signal, and will be referred to as a second feature, and is represented in FIG. 7-9 as a circle shape. The second feature occurs in the pressure signal where underfill and overkiss is present, as shown in FIG. 8. With regards to the clutch system 10, this occurs when the piston 42 applies a force to the plates 52, 54 through the piston rod 44 and the pressure plate 56 during the stabilization phase, indicating underfill of the housing 40. Further, the positive deviation in the pressure signal (representative of the second feature) indicates that the pressure signal is greater than the kiss pressure, indicating overkiss. Additionally, it has been observed and is shown in the data of FIG. 4, that the second feature occurs earlier in time as a severity of underfill is increased, represented by a thickness of a line representing each data set. Further, it has also been observed and is shown in the data of FIG. 5 that the second features occurs later in time as a severity of overkiss is increased. As both an amount of overkiss and an amount of underfill have opposite effects on a position of the second feature, it is hard to determine which error is of greater importance. It does appear, however, that an effect of fill time is greater than that of kiss pressure. Accordingly, at least for fill time, the position of the second feature should be considered to determine the correction action.

Figure 6:
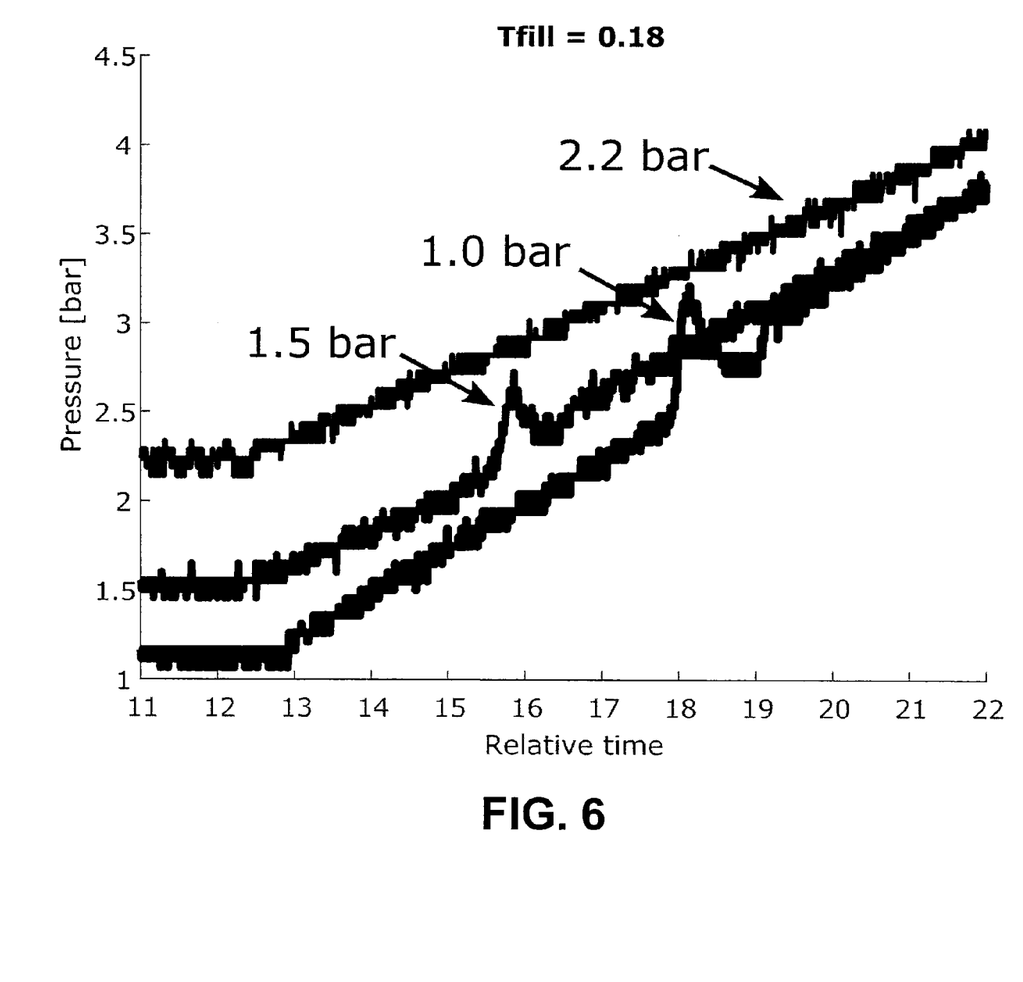
FIG. 6 is a graph which illustrates a portion of several pressure profiles of an engaging hydraulic piston associated with the clutch system illustrated in FIG. 2, the pressure profiles illustrating a feature during a synchronization ramp phase of the clutch system.

FIG. 6 illustrates a feature that occurs during the synchronization ramp (shown in FIG. 1). The feature can be described as a positive deviation in the pressure signal, and will be referred to as a third feature, and is represented in FIG. 7-9 as a having an x shape. The third feature can be a result of either underfill or underkiss. The third feature is pronounced in underfill with all kiss scenarios when the stabilization phase (shown in FIG. 1) is short. If the stabilization phase is longer, however, the third feature can be observed in situations with underkiss. In those situations, overkiss or nominal kiss will compensate for the underfill. With regards to the clutch system 10, this occurs when the piston 42 applies a force to the plates 52, 54 through the piston rod 44 and the pressure plate 56 at too high of a pressure. Information on a severity of the third feature can also be used to determine the type of filling error.

Another feature, a fourth feature, which is not described in detail or illustrated in FIGS. 7-9 could be defined as a delay of the response during the synchronization ramp. The fourth feature has the same causes as the third feature, however. In some instances, one of these features is more easily observed than the other. Accordingly, the learning algorithm detects both in parallel. The third feature and the fourth feature are shown in FIG. 6.

The features described hereinabove are the most important examples of errors which can be detected in the pressure signal of a typical shifting profile. Specific types of errors produce additional features, which are generally more difficult to discern in an automated manner, however, they may be used to augment the learning algorithm. Augment the learning algorithm can allow for a faster convergence rate or a reduced safety factor on the correction step due to higher confidence in the error case.

While the features described hereinabove are indicated on an exemplary pressure profile, the methodology is equally applicable to differently shaped pressure profiles used for the actuation of clutches used in shifting procedures.

FIG. 8 is a fill plane which indicates a location of the types of features with respect to the effects of underfill, overfill, overkiss, and underkiss. It is understood that the fill plane illustrated in FIG. 8 is exemplary of a fill plane for a fixed temperature and a fixed time between shifts. It can be appreciated to one skilled in the art, based on the fill plane of FIG. 8, that the fill plane may be extended into additional dimensions for other effects. Based on the features described hereinabove and a detection of features in a pressure signal, a region of the fill plane in which a previous filling of the clutch occurred may be identified. Based on a region of the fill plane in which the previous filling of the clutch occurred, a corrective action may be made to improve the filling of the clutch in an iterative manner.

In the center of FIG. 8 an ellipse-shaped area is shown indicating a preferred combination of fill time and kiss pressure that may ensure a smooth engagement of the clutch. In addition, within the ellipse-shaped area a circle shape indicating small overkiss and small underfill is shown.

As shown in FIG. 8 by a size of the symbols used to represent the features, the symbol are representative of a severity of the features of the pressure signal. Based on a severity of the features of the pressure signal, a corrective action applied to the fill time and/or the kiss pressure can be appropriately determined. In FIG. 8, not every feature is indicative of a size of a step of a corrective action that may be applied. As a non-limiting example, when the effect of overfill is observed, information is available on the amount of overfill and a presence of overkiss but there is no indication on an amount of overkiss. In such a case, a step in fill time may be determined based on an amount of error, while a step in kiss pressure should be chosen in a more conservative manner, but still in a proper direction to correct the overkiss.

FIG. 9 is a flow chart which illustrates the learning algorithm. FIG. 9 indicates a response which is taken to make an appropriate corrective action based on a presence of the features described hereinabove. A corrective action should only be executed when a feature is present. When multiple features are present, the corrective action having a strongest weight is performed. A correction for a certain error should be scaled with respect to how severe an effect of the observed error is. As non-limiting examples, appropriate measures for a severity of an error can be a timing of the observed feature or a relative height of a deviation in a pressure signal. The scaling depends on an applied pressure profile, a design of the clutch system 10, and the types of sensors incorporated in the clutch system 10, as can be appreciated by one skilled in the art.

In the event that no features are observed in the pressure signal, the fill time is slightly lowered and the kiss pressure is slightly increased. A combination of a small underfill and a small overkiss is desired, as it ensures a smooth actuation of the clutch assembly 22.

By increasing a length of the stabilization phase, some features may be more easily detected. However, increasing a length of the stabilization phase causes a delay in a shift response, which is typically not preferred in most clutch systems. When shifts are performed manually, such an effect is important, as an expectation of an operator of the clutch is typically that a reaction of the clutch system will occur immediately when the clutch system is provided with the shift signal. When shifts are performed in an automatic manner, a delay in the shift response is of lesser concern, and a longer stabilization phase can be used with the clutch system. When the clutch system includes a shift scheduler to allow for prediction of the shifting, the longer stabilization phase can be used with such a clutch system.

It is also within the scope of the present invention close a clutch while another clutch is in operation, thus allowing the pressure signal to be analyzed. Such a procedure allows the clutch system to learn faster, and such a process can be repeated until a good filling is obtained. However, it is understood that such a process should be performed in a manner that does not affect an operating experience. Using such a procedure, the learning algorithm should be implemented carefully, starting with a low fill time and a low kiss pressure. The fill time can be increased until following a long stabilization phase, a slight drop in speed ratio over the clutch can be observed. The fill time can then be slowly increased until the drop in speed ratio occurs at a proper time.

The invention according to present disclosure allows for eliminating a need for recalibrations of the clutch system of the transmission. Using the learning algorithm, the fill parameters are always correctly tuned, and a quality of the filling (and thus a quality of the shift) does not deteriorate over time. Furthermore, due to the learning algorithm, the tolerances associated with the components of the clutch system, the production processes used with the components of the clutch system, and an assembly of the clutch system can be increased without detriment. Lastly, as the correct fill parameters for the clutch system are learned for all conditions, a wider range of transmissions fluids can be used with the clutch system.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method for calibrating a wet clutch, the clutch comprising:
   a pump for providing a housing with a hydraulic fluid,
   a piston being movably disposed in the housing, the piston being movable into an extended position by a preloaded spring and into a retracted position by applying an engagement pressure on the piston by the hydraulic fluid, wherein in the retracted position torque is transmittable through the clutch,
   a proportional valve disposed between the pump and the housing for regulating a pressure of the hydraulic fluid in the housing,
   a controller controlling the proportional valve, a pressure sensor for measuring a pressure of the hydraulic fluid in the housing, the method comprising the steps of closing the clutch by sending a pressure profile with fill parameters from the controller to the proportional valve, recording a pressure signal of the hydraulic fluid, comparing the pressure profile with the pressure signal, determining whether at least one defined feature is in the pressure signal that is indicative of errors in the fill parameters, and, if said feature is determined in the pressure signal, modification of the pressure profile by changing at least one of the fill parameters.

2. The method of claim 1, wherein during modification of the pressure profile at least one of the fill parameters of the pressure profile is increased or decreased by a correction step depending on at least one of an amplitude of the feature in the pressure signal and a presence of the feature in the pressure signal.

3. The method according to claim 1, wherein the feature in the pressure signal comprises at least one of a deviation in the pressure signal and/or a part of the pressure signal being delayed in time.

4. The method according to claim 1, wherein the fill parameters of the pressure profile comprise at least one of:
- a fill time, which indicates the length in time of the pressure profile to fill the housing with hydraulic fluid and to move the piston into its retracted position and
- a kiss pressure being the pressure of the pressure profile at the end of the fill time and indicating a hydraulic pressure in the housing necessary to move the piston in its retracted position.

5. The method according to claim 4, wherein the pressure profile and/or the pressure signal at least comprise at least one of:
- a fill part in which the pressure of the hydraulic fluid increases up to a local maximum and subsequently decreases down to the kiss pressure, the fill part extending in a time interval from the beginning of the fill time up to about 1.5 times the fill time, and
- a stabilization part after the fill part in which the pressure of the hydraulic fluid is substantially constant, and
- a ramp part after the stabilization part in which the pressure of the hydraulic fluid steadily increases.

6. The method according to claim 5, wherein the feature is a deviation in the pressure signal, and wherein,
- if the deviation is detected both in the fill part and in the ramp part of the pressure signal, the pressure profile is modified by at least one of decreasing the fill time and increasing the kiss pressure;
- if the deviation is detected in the fill part of the pressure signal only, the pressure profile is modified by at least one of decreasing the fill time and decreasing the kiss pressure;
- if the deviation is located in the ramp part of the pressure signal only, the pressure profile is modified by at least one of increasing the fill time and increasing the kiss pressure.

7. The method according to claim 5, wherein the stabilization part of the pressure profile is extended compared to normal operation of the clutch for improved detection of the at least one defined feature in the pressure signal.

8. The method according to claim 5, wherein the feature is a deviation located in the stabilization part of the pressure signal, and wherein the pressure profile is modified by at least one of increasing the fill time and decreasing the kiss pressure.

9. The method according to claim 5, wherein the feature is the ramp part of the pressure signal being delayed in time and wherein the pressure profile is modified by at least one of increasing the fill time and increasing the kiss pressure.

10. The method according to claim 5, wherein the feature in the pressure signal is located in at least one of: the fill part, the ramp part, and the stabilization part; wherein the feature is the ramp part of the pressure signal being delayed in time.

11. The method according to claim 10, wherein the feature is a deviation in the pressure signal, and wherein,
- if the deviation is detected both in the fill part and in the ramp part of the pressure signal, the pressure profile is modified by at least one of decreasing the fill time and increasing the kiss pressure;
- if the deviation is detected in the fill part of the pressure signal only, the pressure profile is modified by at least one of decreasing the fill time and by decreasing the kiss pressure;
- if the deviation is located in the ramp part of the pressure signal only, the pressure profile is modified by at least one of increasing the fill time and increasing the kiss pressure.

12. The method according to claim 10, wherein the feature is a deviation located in the stabilization part of the pressure signal, and wherein the pressure profile is modified by at least one of increasing the fill time and decreasing the kiss pressure.

13. The method according to claim 10, wherein the ramp part of the pressure signal is delayed in time, and wherein the pressure profile is modified by at least one of increasing the fill time and increasing the kiss pressure.

14. The method according to claim 1, if no feature is observed in the pressure signal, the pressure profile is either not modified or the pressure profile is modified by lowering the fill time and increasing the kiss pressure for ensuring a smooth engagement of the clutch.

15. The method according to claim 1, the pressure profile further comprising:
- a prefill pulse for at least one of prefilling the housing with hydraulic fluid and prefilling fluid conduits with hydraulic fluid;
- and a prefill stabilization part after the prefill pulse and before the fill part, the prefill stabilization part showing a substantially constant pressure.

16. The method according to claim 1, wherein the method is performed during normal operation of a vehicle or during a shift of the clutch or while another clutch is operational.

17. The method according to claim 1, including the additional steps of:
- recording a speed signal of the clutch by a speed sensor,
- comparing the speed signal with a speed profile,
- determining whether at least one defined feature is in the speed signal of the clutch that is indicative of errors in the fill parameters, and if said feature is detected in the speed signal,
- modification of the pressure profile by additionally taking into account the feature in the speed signal.

18. An apparatus for calibrating a wet clutch, the clutch comprising:
- a pump for providing a housing with a hydraulic fluid,
- a piston being movably disposed in the housing, the piston being movable into an extended position by a preloaded spring and into a retracted position by applying an engagement pressure on the piston by the hydraulic fluid, wherein in the retracted position torque is transmittable through the clutch, a proportional valve disposed between the pump and the housing for regulating a pressure of the hydraulic fluid in the housing, a controller configured for controlling the proportional valve by sending a pressure profile with fill parameters to the proportional valve, a pressure sensor for measuring a pressure of the hydraulic fluid in the housing, a recording device for recording a pressure signal of the hydraulic fluid, a comparing device for comparing pressure signals, and a determining device for determining at least one defined feature in a pressure signal that is indicative of errors in the fill parameters.

19. The apparatus of claim 18, the apparatus being configured to increase or decrease at least one of the fill parameters of the pressure profile by a correction step depending on at least one of an amplitude of the feature in the pressure signal and a presence of the feature in the pressure signal.

20. The apparatus according to claim 18, the apparatus further comprising a speed sensor configured to measure a speed of the clutch, a speed recording device for recording a speed signal, a speed comparison device for comparing the speed with a speed profile, and a speed determining device for determining whether at least one defined feature is in the speed signal of the clutch that is indicative of errors in the fill parameters.

* * * * *